United States Patent
Wilson et al.

(10) Patent No.: US 10,302,796 B2
(45) Date of Patent: *May 28, 2019

(54) ONSHORE ELECTROMAGNETIC RESERVOIR MONITORING

(71) Applicant: HALLIBURTON ENERGY SERVICES, INC., Houston, TX (US)

(72) Inventors: Glenn A. Wilson, Hosuton, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/522,250

(22) PCT Filed: Nov. 26, 2014

(86) PCT No.: PCT/US2014/067777
§ 371 (c)(1),
(2) Date: Apr. 26, 2017

(87) PCT Pub. No.: WO2016/085511
PCT Pub. Date: Jun. 2, 2016

(65) Prior Publication Data
US 2017/0322333 A1 Nov. 9, 2017

(51) Int. Cl.
*G01H 9/00* (2006.01)
*G01V 3/12* (2006.01)
(Continued)

(52) U.S. Cl.
CPC ............ *G01V 3/12* (2013.01); *E21B 43/16* (2013.01); *G01H 9/004* (2013.01); *G01V 8/02* (2013.01); *G01V 8/24* (2013.01); *G01V 9/02* (2013.01)

(58) Field of Classification Search
CPC . E21B 43/16; G01V 8/24; G01V 8/20; G01V 8/02; G01V 9/02; G01V 3/12; G01H 9/004
See application file for complete search history.

(56) References Cited

U.S. PATENT DOCUMENTS 4,090,141 A 5/1978 Leblanc
4,222,261 A 9/1980 Leblanc et al.
(Continued)

FOREIGN PATENT DOCUMENTS

EP 1 803 001 2/2012
WO 2005/085909 9/2005
(Continued)

OTHER PUBLICATIONS

PCT International Search Report and Written Opinion, dated Aug. 12, 2015, Appl No. PCT/US2014/067777, "Onshore Electromagnetic Reservoir Monitoring," Filed Nov. 26, 2014, 17 pgs.
(Continued)

Primary Examiner — Bryan Bui
(74) Attorney, Agent, or Firm — Gilliam IP PLLC

(57) ABSTRACT

Onshore electromagnetic (EM) reservoir monitoring systems and methods, including a system with a light source producing a light beam and an EM sensor array positioned above ground or buried underground over one or more regions of interest within a subterranean formation, the array coupled to the light source with an optical fiber. An EM sensor modulates the interrogation light beam in response to an EM signal induced into the subterranean formation by an EM source. The system further includes a processor controlling the light source, processing modulated light received from the array, and collecting data with the array to produce EM surveys, each EM survey based on data sets collected at different times. The EM sensor is physically isolated from a (Continued)

surrounding environment. The surveys are combined to produce a time lapse earth model of the regions of interest.

18 Claims, 9 Drawing Sheets

(51) Int. Cl.
*G01V 8/02* (2006.01)
*G01V 8/24* (2006.01)
*G01V 9/02* (2006.01)
*E21B 43/16* (2006.01)

(56) References Cited

U.S. PATENT DOCUMENTS

| | | |
|---|---|---|
| 4,348,587 A | 9/1982 | Tangonan et al. |
| 4,360,272 A | 11/1982 | Schmadel et al. |
| 4,376,248 A | 3/1983 | Giallorenzi et al. |
| 4,433,291 A | 2/1984 | Yariv |
| 4,596,442 A | 6/1986 | Anderson et al. |
| 4,622,460 A | 11/1986 | Failes et al. |
| 4,868,495 A | 9/1989 | Einzig et al. |
| 4,918,371 A | 4/1990 | Bobb |
| 4,950,883 A | 8/1990 | Glenn |
| 4,973,845 A | 11/1990 | Mastrippolito et al. |
| 4,996,419 A | 2/1991 | Morey |
| 5,047,741 A | 9/1991 | Laskaris et al. |
| 5,275,038 A | 1/1994 | Sizer et al. |
| 5,294,788 A | 3/1994 | Charon et al. |
| 5,305,075 A | 4/1994 | Bucholtz et al. |
| 5,317,576 A | 5/1994 | Leonberger et al. |
| 5,471,139 A | 11/1995 | Zadoff |
| 5,511,083 A | 4/1996 | D'Amato et al. |
| 5,513,913 A | 5/1996 | Ball et al. |
| 5,563,513 A | 10/1996 | Tasci et al. |
| 5,642,051 A | 6/1997 | Babour et al. |
| 5,691,999 A | 11/1997 | Ball et al. |
| 5,754,284 A | 5/1998 | Leblanc et al. |
| 5,770,945 A | 6/1998 | Constable |
| 5,804,736 A | 9/1998 | Klauder et al. |
| 5,844,927 A | 12/1998 | Kringlebotn |
| 6,188,712 B1 | 2/2001 | Jiang et al. |
| 6,229,308 B1 | 5/2001 | Freedman |
| 6,229,808 B1 | 5/2001 | Teich et al. |
| 6,271,766 B1 | 8/2001 | Didden et al. |
| 6,289,740 B1 | 9/2001 | Posey, Jr. et al. |
| 6,294,917 B1 | 9/2001 | Nichols |
| 6,314,056 B1 | 11/2001 | Bunn et al. |
| 6,325,153 B1 | 12/2001 | Harrell |
| 6,332,109 B1 | 12/2001 | Sheard et al. |
| 6,393,363 B1 | 5/2002 | Wilt et al. |
| 6,412,555 B1 | 7/2002 | Sten-Halvorsen et al. |
| 6,463,186 B1 | 10/2002 | Li et al. |
| 6,534,986 B2 | 3/2003 | Nichols |
| 6,597,481 B1 | 7/2003 | Fatehi et al. |
| 6,630,658 B1 | 10/2003 | Bohnert et al. |
| 6,724,469 B2 | 4/2004 | Leblanc |
| 6,728,165 B1 | 4/2004 | Roscigno et al. |
| 6,731,114 B1 | 5/2004 | Lagabrielle et al. |
| 6,747,743 B2 | 6/2004 | Skinner et al. |
| 6,809,516 B1 | 10/2004 | Li et al. |
| 6,914,433 B2 | 7/2005 | Wright et al. |
| 6,957,576 B2 | 10/2005 | Skinner et al. |
| 6,961,601 B2 | 11/2005 | Matthews et al. |
| 7,077,200 B1 | 7/2006 | Adnan et al. |
| 7,109,717 B2 | 9/2006 | Constable et al. |
| 7,151,377 B2 | 12/2006 | Chouzenoux et al. |
| 7,183,777 B2 | 2/2007 | Bristow et al. |
| 7,391,942 B2 | 6/2008 | Loock et al. |
| 7,477,160 B2 | 1/2009 | Lemenager et al. |
| 7,489,134 B2 | 2/2009 | Reiderman |
| 7,492,168 B2 | 2/2009 | Ogilvy et al. |
| 7,673,682 B2 | 3/2010 | Daily |
| 7,747,388 B2 | 6/2010 | Mombourquette et al. |
| 8,035,393 B2 | 10/2011 | Tenghamn et al. |
| 8,058,869 B2 | 11/2011 | Cranch et al. |
| 8,165,178 B2 | 4/2012 | Henderson et al. |
| 8,379,438 B2 | 2/2013 | Tio Castro et al. |
| 8,380,439 B2 | 2/2013 | Lagmanson et al. |
| 8,437,961 B2 | 5/2013 | Srnka et al. |
| 8,633,700 B1 | 1/2014 | England et al. |
| 8,710,845 B2 | 4/2014 | Lindqvist et al. |
| 9,008,970 B2 | 4/2015 | Donderici et al. |
| 9,081,114 B2 | 7/2015 | Nie et al. |
| 9,091,785 B2 | 7/2015 | Donderici et al. |
| 9,127,531 B2 | 9/2015 | Maida et al. |
| 9,181,754 B2 | 11/2015 | Donderici et al. |
| 9,273,548 B2 | 3/2016 | Leblanc et al. |
| 9,297,767 B2 | 3/2016 | Maida, Jr. et al. |
| 2001/0023614 A1 | 9/2001 | Tubel et al. |
| 2002/0063866 A1 | 5/2002 | Kersey et al. |
| 2003/0038634 A1 | 2/2003 | Strack |
| 2003/0057950 A1 | 3/2003 | Gao et al. |
| 2003/0094281 A1 | 5/2003 | Tubel |
| 2003/0205083 A1 | 11/2003 | Tubel et al. |
| 2003/0205375 A1 | 11/2003 | Wright et al. |
| 2004/0006429 A1 | 1/2004 | Brown |
| 2004/0033017 A1 | 2/2004 | Kringlebotn et al. |
| 2004/0093950 A1 | 5/2004 | Bohnert |
| 2004/0104051 A1 | 6/2004 | Moriarty et al. |
| 2004/0117119 A1 | 6/2004 | West et al. |
| 2004/0140091 A1 | 7/2004 | Gupta |
| 2005/0156602 A1 | 7/2005 | Conti |
| 2005/0206385 A1 | 9/2005 | Strack et al. |
| 2006/0081412 A1 | 4/2006 | Wright et al. |
| 2006/0214098 A1 | 9/2006 | Ramos |
| 2006/0220651 A1 | 10/2006 | Clark |
| 2006/0250274 A1 | 11/2006 | Mombourquette et al. |
| 2006/0272809 A1 | 12/2006 | Tubel et al. |
| 2007/0000912 A1 | 1/2007 | Aisenbrey |
| 2007/0062696 A1* | 3/2007 | Wilson .................. E21B 47/123 166/254.2 |
| 2007/0126594 A1 | 6/2007 | Atkinson et al. |
| 2007/0228288 A1 | 10/2007 | Smith |
| 2007/0278008 A1 | 12/2007 | Kuckes et al. |
| 2008/0041575 A1 | 2/2008 | Clark et al. |
| 2008/0042636 A1 | 2/2008 | Koste et al. |
| 2008/0053702 A1 | 3/2008 | Smith, Jr. |
| 2008/0106265 A1 | 5/2008 | Campbell |
| 2008/0123467 A1 | 5/2008 | Ronnekleiv et al. |
| 2008/0210426 A1 | 9/2008 | Lembcke et al. |
| 2008/0241964 A1 | 10/2008 | Kaieda et al. |
| 2008/0246485 A1 | 10/2008 | Hibbs et al. |
| 2008/0290873 A1 | 11/2008 | Homan et al. |
| 2008/0317400 A1 | 12/2008 | Petrov |
| 2009/0005994 A1 | 1/2009 | Srnka et al. |
| 2009/0039888 A1 | 2/2009 | MacGregor et al. |
| 2009/0044977 A1 | 2/2009 | Johnson et al. |
| 2009/0071080 A1 | 3/2009 | Bourgain et al. |
| 2009/0102474 A1 | 4/2009 | Cranch et al. |
| 2009/0179647 A1 | 7/2009 | Wang et al. |
| 2009/0188665 A1 | 7/2009 | Tubel et al. |
| 2009/0199630 A1 | 8/2009 | Difoggio et al. |
| 2009/0237084 A1 | 9/2009 | Itskovich et al. |
| 2009/0268197 A1 | 10/2009 | Perron et al. |
| 2009/0296755 A1 | 12/2009 | Brown et al. |
| 2009/0308657 A1 | 12/2009 | Clark et al. |
| 2010/0013487 A1 | 1/2010 | Bloemenkamp |
| 2010/0046002 A1 | 2/2010 | Perez et al. |
| 2010/0097065 A1 | 4/2010 | Itskovich et al. |
| 2010/0118657 A1 | 5/2010 | Trinh et al. |
| 2010/0134113 A1 | 6/2010 | Depavia et al. |
| 2010/0185393 A1 | 7/2010 | Liang et al. |
| 2010/0198519 A1 | 8/2010 | Wilt et al. |
| 2010/0224362 A1 | 9/2010 | Carazzone |
| 2010/0237084 A1 | 9/2010 | Freed |
| 2010/0271030 A1 | 10/2010 | Reiderman et al. |
| 2010/0277177 A1 | 11/2010 | Alumbaugh et al. |
| 2011/0017512 A1 | 1/2011 | Codazzi |
| 2011/0074428 A1 | 3/2011 | Wang |
| 2011/0083838 A1 | 4/2011 | Labrecque |
| 2011/0084696 A1 | 4/2011 | Tenghamn et al. |
| 2011/0088462 A1 | 4/2011 | Samson et al. |
| 2011/0090496 A1 | 4/2011 | Samson et al. |

(56) References Cited

U.S. PATENT DOCUMENTS

| | | |
|---|---|---|
| 2011/0100632 A1 | 5/2011 | Dinariev et al. |
| 2011/0139447 A1 | 6/2011 | Ramos et al. |
| 2011/0158043 A1 | 6/2011 | Johnstad |
| 2011/0163891 A1 | 7/2011 | Wilson et al. |
| 2011/0170112 A1 | 7/2011 | Gibler et al. |
| 2011/0188347 A1 | 8/2011 | Thiercelin et al. |
| 2011/0198078 A1 | 8/2011 | Harrigan et al. |
| 2011/0277996 A1 | 11/2011 | Cullick et al. |
| 2011/0298461 A1 | 12/2011 | Bittar et al. |
| 2011/0308788 A1 | 12/2011 | Ravi et al. |
| 2012/0001625 A1 | 1/2012 | Yamada et al. |
| 2012/0013893 A1 | 1/2012 | Maida et al. |
| 2012/0014211 A1 | 1/2012 | Maida, Jr. et al. |
| 2012/0020184 A1 | 1/2012 | Wilson et al. |
| 2012/0061084 A1 | 3/2012 | Sweatman et al. |
| 2012/0090827 A1 | 4/2012 | Sugiura |
| 2012/0111633 A1 | 5/2012 | Sunil |
| 2012/0126993 A1 | 5/2012 | Samson et al. |
| 2012/0130641 A1 | 5/2012 | Morrison et al. |
| 2012/0147381 A1 | 6/2012 | Leblanc et al. |
| 2012/0147924 A1 | 6/2012 | Hall |
| 2012/0175513 A1 | 7/2012 | Duncan et al. |
| 2012/0191353 A1 | 7/2012 | Wilt et al. |
| 2012/0205103 A1 | 8/2012 | Ravi et al. |
| 2012/0212229 A1 | 8/2012 | Sinclair et al. |
| 2012/0223717 A1 | 9/2012 | Labrecque |
| 2012/0234605 A1 | 9/2012 | Donderici et al. |
| 2012/0257475 A1 | 10/2012 | Luscombe et al. |
| 2012/0293179 A1 | 11/2012 | Colombo et al. |
| 2013/0018585 A1 | 1/2013 | Zhdanov et al. |
| 2013/0018588 A1 | 1/2013 | Zhdanov et al. |
| 2013/0032404 A1 | 2/2013 | Donderici et al. |
| 2013/0033961 A1 | 2/2013 | Burnstad |
| 2013/0056197 A1 | 3/2013 | Maida et al. |
| 2013/0105224 A1 | 5/2013 | Donderici et al. |
| 2013/0118734 A1 | 5/2013 | Csutak et al. |
| 2013/0127471 A1 | 5/2013 | Südow et al. |
| 2013/0141102 A1 | 6/2013 | Donderici et al. |
| 2013/0146756 A1 | 6/2013 | Schmidt |
| 2013/0166215 A1 | 6/2013 | Bittar et al. |
| 2013/0169278 A1 | 7/2013 | Bittar et al. |
| 2013/0207661 A1 | 8/2013 | Ellingsrud et al. |
| 2013/0245947 A1 | 9/2013 | Samsom et al. |
| 2013/0248250 A1 | 9/2013 | Bittar et al. |
| 2013/0249705 A1 | 9/2013 | Sharp et al. |
| 2013/0279841 A1 | 10/2013 | Joinson |
| 2013/0293235 A1 | 11/2013 | Bloemenkamp et al. |
| 2013/0297215 A1 | 11/2013 | Rondeleux |
| 2014/0032116 A1 | 1/2014 | Guner et al. |
| 2014/0036628 A1 | 2/2014 | Hill et al. |
| 2014/0097848 A1 | 4/2014 | Leblanc et al. |
| 2014/0111348 A1 | 4/2014 | Skinner et al. |
| 2014/0139225 A1 | 5/2014 | Mandviwala |
| 2014/0139226 A1 | 5/2014 | Jaaskelainen et al. |
| 2014/0191120 A1 | 7/2014 | Donderici et al. |
| 2014/0191761 A1 | 7/2014 | San Martin et al. |
| 2014/0222343 A1 | 8/2014 | Samson et al. |
| 2014/0244175 A1 | 8/2014 | Donderici et al. |
| 2015/0137817 A1 | 5/2015 | Wilson et al. |
| 2015/0160365 A1 | 6/2015 | Donderici et al. |
| 2015/0330190 A1 | 11/2015 | Wu et al. |
| 2016/0187525 A1 | 6/2016 | Wilson et al. |
| 2016/0259085 A1 | 9/2016 | Wilson et al. |
| 2016/0266269 A1 | 9/2016 | Wilson et al. |
| 2017/0227665 A1* | 8/2017 | Wilson .................. G01V 3/12 |

FOREIGN PATENT DOCUMENTS

| | | |
|---|---|---|
| WO | 2005085909 A1 | 9/2005 |
| WO | 2012/100217 | 7/2012 |
| WO | 2012/145583 | 10/2012 |
| WO | 2012145583 A1 | 10/2012 |
| WO | 2012/177349 | 12/2012 |
| WO | 2012177349 A1 | 12/2012 |
| WO | 2013012967 A1 | 1/2013 |
| WO | 2015160347 A1 | 10/2015 |
| WO | 2015178878 A1 | 11/2015 |
| WO | 2016085511 A1 | 6/2016 |

OTHER PUBLICATIONS

Colombo, Daniele et al., "Quantifying Surface-To-Reservoir Electromagnetics for Waterflood Monitoring in a Saudi Arabian Carbonate Reservoir", Geophysics, 78(6) E281-E297, 2013.

Hibbs, A D. et al., "Advances in Electromagnetic Survey Instrumentation and the Use of a Cased Borehole for Imaging a Deep Formations", 76th EAGE Conference & Exhibition 2014 Amsterdam RAI, The Netherlands, Jun. 16-19, 2014, 2014, 3 pgs.

Hibbs, A. D. et al., "Capacitive Electric Field Measurements for Geophysics", EAGE Conference and Exhibition incorporating SPE EUROPEC 2011, Vienna, Austria, Expanded Abstracts, 2011, 2 pgs.

Hibbs, Andrew et al., "New Electromagnetic Sensors for Magnetotelluric and Induced Polarization Geophysical Surveys", SEG Annual Meeting, Expanded Abstracts, 2012, 5 pgs.

Hordt, A et al., "A First Attempt at Monitoring Underground Gas Storage by Means of Time-lapse Multichannel Transient Electromagnetics", Geophysical Prospecting, 2000, 48, 489-509, European Association of Geoscientists & Engineers, 2000, 21 pgs.

Marsala, Alberto F. et al., "First Borehole to Surface Electromagnetic Survey in KSA: Reservoir Mapping and Monitoring at a New Scale", SPE 146348, 2011, 9 pgs.

Marsala, Alberto F. et al., "Fluid Distribution Inter-Well Mapping in Multiple Reservoirs by Innovative Borehole to Surface Electromagnetic: Survey Design and Field Acquisition", IPTC 17045, 2013, 4 pgs.

Marsala, Alberto F. et al., "Six-Component Tensor of the Surface Electromagnetic Field Produced by a Borehole Source Recorded by Innovative Capacitive Sensors", Presented at SEG 83rd Annual Meeting, 2013, 5 pgs.

Schamper, Cyril et al., "4D CSEM Feasibility Study: A Land Example", SEG Houston 2009 International Exposition and Annual Meeting, 2009, 5 pgs.

Strack, K M. et al., "Integrating Long-Offset Transient Electromagnetics (LOTEM) with Seismics in an Exploration Environment", Geophysical Prospecting, 1996, 44, 997-7017, European Association of Geo-scientists & Engineers, 1996, 21 pgs.

Tseng, H.W. et al., "A Borehole-to-Surface Electromagnetic Survey", Geophysics, 63(5), 1565-1572, 1998.

Wirianto, Marwan et al., "A Feasibility Study of Land CSEM Reservoir Monitoring in a Complex 3D Model", Geophysical Journal International, Piers Online, vol. 6, No. 5, 2010, pp. 440-444.

Wright, David et al., "Hydrocarbon detection and monitoring with a multicomponent transient electromagnetic (MTEM) survey", The Leading Edge, 21 (9), 2002, pp. 862-864.

Zhdanov, Michael S. et al., "Feasibility study of electromagnetic monitoring of CO2 sequestration in deep reservoirs", SEG Houston 2013 Annual Meeting, DOI http://dx.doi.org/10.1190/segam2013-0694.1, 2013, pp. 2417-2421.

Canadian Application Serial No. 2,961,172; Examiner's Letter: Aug. 31, 2018, 6 pages.

Mwenifumbo, et al., "Field Evaluation of a New Borehole Resistivity Probe Using Capacitive Electrodes", Proceedings of the Symposium on the Applications of Geophysics to Engineering and Environmental Problems, 1999, pp. 859-867.

Orange, et al., "The Feasibility of Reservoir Monitoring Using Time-Lapse Marine CSEM", Geophysics, 74 (2), pp. F21-F29.

Panissod, et al., "Recent Developments in Shallow-Depth Electrical and Electrostatic Prospecting Using Mobile Arrays", Geophysics, vol. 63, No. 5 (Sep.-Oct. 1998), 1998, pp. 1542-1550.

Park, et al., "CSEM sensitivity study for Sleipner CO2-injection monitoring", Energy Procedia 37, SciVerse ScienceDirect, pp. 4199-4206.

Petia, "Second Generation of Lead-Lead Chloride Electrodes for Geophysical Applications", Pure and Applied Geophysics, 157, 2000, pp. 357-382.

(56) References Cited

OTHER PUBLICATIONS

Raiche, "A Flow-Through Hankel Transform Technique for Rapid, Accurate Green's Function Computation", Radio Science, 34 (2), 1999 pp. 549-555.
Salak0, et al., "Potential Applications of Time-lapse Marine CSEM to Reservoir Monitoring", 75th EAGE Conference & Exhibition incorporating SPE EUROPEC, London, UK, Jun. 10-13, 2013, 5 pgs.
Schamper, et al., "4D CSEM Feasibility Study: A Land Example", SEG Houston 2009 International Exposition and Annual Meeting, 2009, 5 pgs.
Schmidt-Hatternberger, et al., "Electrical resistivity tomography ERT) for monitoring of CO2 migration—from tool development to reservoir surveillance at the Ketzin pilot site", Energy Procedia 37, SciVerse ScienceDirect, 2013, pp. 4268-4275.
Shima, et al., "Developments of Non-Contact Data Acquisition Techniques in Electrical and Electromagnetic Explorations", Journal of Applied Geophysics, 35, 1996, pp. 167-173.
Shima, et al., "Fast Imaging of Shallow Resistivity Structures Using a Multichannel Capacitive Electrode System", SEG Annual Meeting, Expanded Abstracts, pp. 377-380.
Strack, et al., "Integrating Long-Offset Transient Electromagnetics (LOTEM) with Seismics in an Exploration Environment", Geophysical Prospecting, 1996, 44, 997-1017, European Association of Geoscientists & Engineers, 1996), 21 pgs.
Tabbagh, et al., "Determination of Electrical Properties of the Ground at Shallow Depth With an Electrostatic Quadrupole: Field Trials on Archaeological Sites", Geophysical Prospecting, 41, (1993), pp. 579-597.
Thiel, et al., "On Measuring Electromagnetic Surface Impedance—Discussions with Professor James R. Wait", IEEE Transactions on Antennas and Propagation, vol. 48, No. 10, (2000), pp. 1517-1520.
Timofeeev, et al., "A New Ground Resistivity Method for Engineering and Environmental Geophysics", Proceedings of the Symposium on the Applications of Geophysics to Engineering and Environmental Problems, (1994), pp. 701-715.
Tondel, et al., "Remote Reservoir Monitoring in Oil Sands: From Feasibility Study to Baseline Datasets", CSEG-CSPG-CWLS GeoConvention, Expanded Abstracts, (2013), 5 pgs.
Tondel, et al., "Reservoir monitoring in oil sands: Developing a permanent cross-well system", Presented at SEG Annual Meeting, 2011, San Antonio, 5 pgs.
Tseng, et al., "A Borehole-to-Surface Electromagnetic Survey", Geophysics, 63(5), pp. 1565-1572, (1998).
Tumanski, "Induction coil sensors—a reivew", Institute of Physics Publishing, Measurement Science and Technology. 18 (2007) R31-R46, 2007, 17 pgs.
Vohra, et al., "Fiber-optic ac electric-field sensor based on the electrostrictive effect", Optic Letters, vol. 17, No. 5, Mar. 1, 1992, Mar. 1, 1992, 3 pgs.
Wilt, et al., "Crosswell Electromagnetic Tomography: System Design Considerations and Field Results", Geophysics, vol. 60, No. 3 (May-Jun. 1995), pp. 871-855.
Wirianto, et al., "A Feasibility Study of Land CSEM Reservoir Monitoring in a Complex 3D Model", Geophysical Journal International, Piers Online, vol. 6, No. 5, (2010), pp. 440-444.
Wright, et al., "Hydrocarbon detection and monitoring with a multicomponent transient electromagnetic (MTEM) survey", The Leading Edge, 21 (9), 2002, 7 pages.
Yang, et al., "Optical fiber magnetic field sensors with TbDyFe magnetostrictive thin films as sensing materials", National Engineering Laboratory for Optical Fiber Sensors, 2009, Optical Society of America, (2009), 6 pgs.
Zach, et al., "Marine CSEM Time-Lapse Repeatability for Hydrocarbon Field Monitoring", Presented at SEG Annual Meeting in Houston, (2009), 5 pgs.
Zhdanov, et al., "3D inversion of towed streamer EM data—A model study of the Harding field and comparison to 3D CSEM inversion", SEG San Antonio 2011 Annual Meeting, (2011), 5 pgs.
Zhdanov, et al., "Feasibility study of electromagnetic monitoring of CO2 sequestration in deep reservoirs", SEG Houston 2013 Annual Meeting, DOI http://dx.doi.org/10.0090/segam2013-0694.1, 2013, pp. 2417-2421.
Ziolkowski, et al., "Multi-Transient Electromagnetic Repeatability Experiment Over the North Sea Harding Field", Geophysical Prospecting, 58, (2010), pp. 1159-1176.
Zonge, et al., "The Effect of Electrode Contact Resistance on Electric Field Measurements", 55th SEG Annual Meeting, Washington D.C., Expanded Abstracts, (1985), 8 pgs.
Australian Patent App. No. 2014384700, Examination Report, dated Sep. 14, 2016, 3 pgs.
PCT Application No. PCT/US2013/075117, International Preliminary Report on Patentability, dated Jun. 23, 2016, 9 pgs.
PCT Application No. PCT/US2013/075117, International Search Report & Written Opinion, dated Sep. 12, 2014, 12 pgs.
PCT Application No. PCT/US2014/019228, International Preliminary Report on Patentability, dated Sep. 15, 2016, 10 pgs.
PCT Application No. PCT/US2014/019228, International Search Report & Written Opinion, dated Nov. 5, 2014, 12 pgs.
PCT Application No. PCT/US2014/034416, International Preliminary Report on Patentability, dated Oct. 18, 2016, 10 pgs.
PCT Application No. PCT/US2014/034416, International Search Report & Written Opinion, dated Jan. 19, 2015, 13 pgs.
PCT Application No. PCT/US2014/038552, International Preliminary Report on Patentability, dated Nov. 22, 2016, 11 pgs.
PCT Application No. PCT/US2014/038552, International Search Report & Written Opinion, dated Feb. 17, 2015, 13 pgs.
PCT Application No. PCT/US2014/067774, International Search Report & Written Opinion, dated Aug. 11, 2015, 15 pgs.
PCT Application No. PCT/US2014/067777, International Search Report & Written Opinion, dated Aug. 12, 2015, 15 pgs.
PCT Application No. PCT/US2015/063755, International Search Report & Written Opinion, dated Aug. 16, 2016, 12 pgs.
U.S. Final Office Action, dated Dec. 13, 2016, U.S. Appl. No. 14/760,718, "Time-Lapse Electromagnetic Monitoring," filed Jul. 14, 2015, 27 pgs.
Andreis, et al., "Using CSEM to Monitor Production From a Complex 3D Gas Reservoir—A Synthetic Case Study", The Leading Edge, 30 (11), Sep. 2011, pp. 1070-1079.
Bergmann, et al., "Surface-downhole electrical resistivity tomography applied to monitoring of CO2 storage at Ketzin, Germany", Geophysics, vol. 77, No. 6, Nov.-Dec. 2012, pp. B253-B267.
Berre, et al., "Identification of three-dimensional electric conductivity changes from time-lapse electromagnetic observations", Journal of Computational Physics, 23, (2011), pp. 3915-3928.
Bhuyian, et al., "3D CSEM modeling and time-lapse sensitivity analysis for subsurface CO2 storage", Geophysics 77 (5), (2012), pp. E343-E355.
Black, et al., "3D inversion of time-lapse CSEM data based on dynamic reservoir simulations of the Harding field, North Sea", 2011 SEG San Antonio 2011 Annual Meeting, pp. 666-667.
Black, et al., "3D inversion of time-lapse CSEM data for reservoir surveillance", SEG Denver 2010 Annual Meeting 716, (2010), 5 pgs.
Black, et al., "Monitoring of hydrocarbon reservoirs using marine CSEM method", SEG Houston 2009 International Exposition and Annual Meeting, (2009) 5 pgs.
Bristow, et al., "A New Temperature Capacitive-Resistivity, and Magnetic-Susceptibility Borehole Probe for Mineral Exploration, Groundwater, and Environmental Applications", GeologicalSurvey of Canada, Technical Note No. 3, doi: 10.4095/289197, 2011, 12 pgs.
Carrigan, et al., "Electrical resistance tomographic monitoring of CO2 movement in deep geologic reservoirs", International Journal of Greenhouse Gas Control, doi: 10.1016/j.ijggc.2013.04.016, (2013), pp. 401-408.
Christensen, et al., "Monitoring CO2 injection with cross-hole electrical resistivity tomography", Exploration Geophysics, Butsuri-Tansa (vol. 59, No. 1), Mulli-Tamsa (vol. 9, No. 1), 2005, pp. 44-49.
Chuprin, et al., "Quantifying factors affecting repeatability in CSEM surveying for reservoir appraisal and monitoring", SEG Las Vegas 2008 Annual Meeting, 2008, pp. 648-652.

(56) References Cited

OTHER PUBLICATIONS

Colombo, "Quantifying Surface-to-Reservoir Electromagnetics for Waterflood Monitoring in a Saudi Arabian Carbonate Reservoir", Geophysics, 78(6) E281-E297, (2013).
Deceuster, et al., "Automated Identification of Changes in Electrode Contact Properties for Long Term Permanent ERT Monitoring Experiments", Geophysics, vol. 78, No. 2 (Mar.-Apr. 2013), 2011, pp. E79-E94.
Douma, et al., "A Capacitive-Coupled Ground Resistivity System for Engineering and Environmental Applications: Results of Two Canadian Field Tests", SEG Annual Meeting, Expanded Abstracts, 1994, pp. 559-561.
Grard, et al., "A Mobile Four-Electrode Array and Its Application to the Electrical Survey of Planetary Grounds at Shallow Depths", Journal of Geophysical Research, vol. 96, No. B3, Mar. 10, 1991, pp. 4117-4123.
Habashy, et al., "Beyond the Born and Rytov Approximations: A Nonlinear Approach to Electromagnetic Scattering", Journal of Geophysical Research, vol. 98, No. B2, pp. 1759-1775, Feb. 10, 1993.
Haber, et al., "Enhanced Reservoir Monitoring using Coupled Electromagnetics and Flow Modeling", Computational Geosciences Inc., Presented at ASEG 23rd International Conference and Exhibition, Melbourne, Australia, 1 pg.
Hibbs, et al., "Advances in Electromagnetic Survey Instrumentation and the Use of a Cased Borehole for Imaging a Deep Formations", 76th EAGE Conference &Exhibition 2014 Amsterdam RAI, The NetherlandsJun. 16-19, 2014, (2014), 3 pgs.
Hibbs, et al., "Capacitive Electric Field Measurements for Geophysics", EAGE Conference and Exhibition incorporating SPE EUROPEC 2011, Vienna, Austria, Expanded Abstracts, 2011, 2 pgs.
Hibbs, et al., "New Electromagnetic Sensors for Magnetotelluric and Induce Polarization Geophysical Surveys", SEG Annual Meeting, Expanded Abstracts, 2012, 5 pgs.
Holten, et al., "Time lapse CSEM measurements for reservoir monitoring using a vertical receiver-transmitter setup", 2011 SEG San Antonio 2011 Annual Meeting, (2011), pp. 697-701.
Hordt, et al., "A First Attempt at Monitoring Underground Gas Storage by Means of Time-lapse Multichannel Transient Electromagnetics", Geophysical Prospecting, 2000, 48, 489-509, European Association of Geoscientists & Engineers, (2000), 21 pgs.
Hoversten, et al., "Crosswell Electromagnetic and Seismic Imaging: An Examination of Coincident Surveys at a Steam Flood Project", Geophysics, 69 (2), (2004), pp. 406-414.
Kang, et al., "A Feasibility Study of $CO_2$ Sequestration Monitoring Using the MCSEM Method at a Deep Brine Aquifer in a Shallow Sea", Geophysics 77 (20, 2012, pp. E117-E126.
Kiessling, et al., "Geoelectrical Methods for Monitoring Geological $CO_2$ Storage; First Results From Cross-Hole and Surface-Downhole Measurements From the CO2Sink Test Site at Ketzin (Germany)", International Journal of Greenhouse Gas Control, 4, 2010, pp. 816-826.
Kuras, et al., "Capacitive Resistivity Imaging With Towed Arrays", Journal of Engineering and Environmental Geophysics, vol. 12, Issue 3, 2007, pp. 267-279.
Kuras, et al., "Fundamentals of the Capacitive Resistivity Technique", Geophysics, vol. 71, No. 3 (May-Jun. 2006), 2006, pp. G135-G152.
Labrecque, et al., "Assessment of Measurement Errors for Galvanic-Resistivity Electrodes of Different Composition", Geophysics, vol. 73, No. 2 (Mar.-Apr. 2008), 2008, pp. F55-F64.
Liang, et al., "Joint Inversion of Controlled-Source Electromagnetic and Production Data for Reservoir Monitoring", Geophysics 77 (5), pp. ID9-ID22.
Lien, et al., "Sensitivity Study of Marine CSEM Data for Reservoir Production Monitoring", Geophysics, 73 (4), 2008, pp. F151-F163.
Maas, et al., "A Fibre Optic Multi-Component Seismic Acquisition System for Permanent Reservoir Monitoring", Presented at 2008 SPE Asia Pacific Oil and Gas Conference, SPE 115185, (2008), 7 pgs.
Macnae, "Electric Field Measurements in Air", SEG Annual Meeting, Expanded Abstracts, 2010, pp. 1773-1777.
Marsala, et al., "First Borehole to Surface Electromagnetic Survey in KSA: Reservoir Mapping and Monitoring at a New Scale", SPE 146348, (2011), 9 pgs.
Marsala, et al., "Fluid Distribution Inter-Well Mapping in Multiple Reservoirs by Innovative Borehole to Surface Electromagnetic: Survey Design and Field Acquisition", IPTC 17045, (2013), 4 pgs.
Marsala, et al., "Six-Component Tensor of the Surface Electromagnetic Field Produced by a Borehole Source Recorded by Innovative Capacitive Sensors", Presented at SEG 83rd Annual Meeting, (2013), 5 pgs.
Mwenifumbo, et al., "Capacitive Conductivity Logging and Electrical Stratigraphy in a High-Resistivity Aquifer, Boise Hydrogeophysical Research Site", Geophysics, vol. 74, No. 3 (May-Jun. 2009), 2009, pp. E125-E133.

* cited by examiner

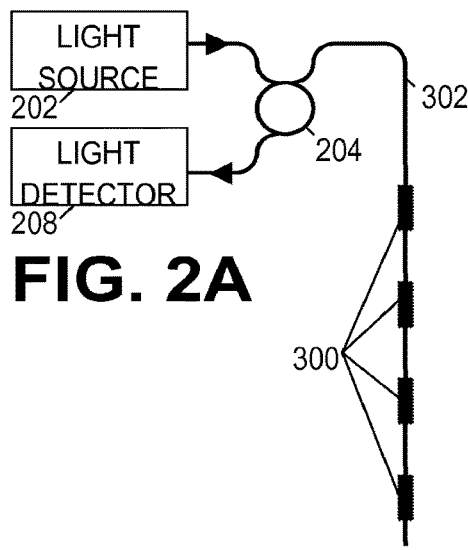
FIG. 2A
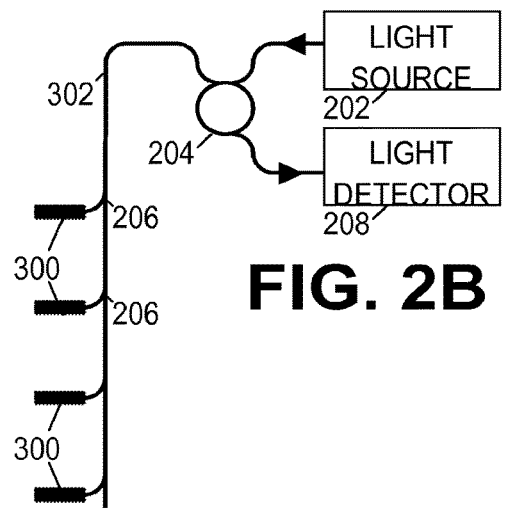
FIG. 2B
FIG. 2C
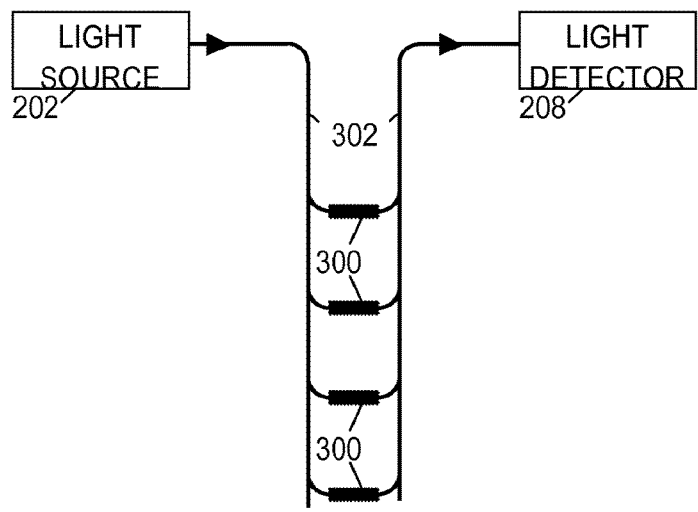

ONSHORE ELECTROMAGNETIC RESERVOIR MONITORING

BACKGROUND

Oil field operators dedicate significant resources to improve the recovery of hydrocarbons from reservoirs while reducing recovery costs. To achieve these goals, reservoir engineers both monitor the current state of the reservoir and attempt to predict future behavior given a set of current and/or postulated conditions. Reservoir monitoring, sometimes referred to as reservoir surveillance, involves the regular collection and monitoring of measured near-wellbore production data from within and around the wells of a reservoir. Such data may be collected using sensors installed inline along production tubing introduced into the well. The data may include, but is not limited to, water saturation, water and oil cuts, fluid pressure and fluid flow rates, is generally collected at a fixed, regular interval (e.g., once per minute) and is monitored in real-time by field personnel. As the data is collected, it is archived into a historical database.

The production and survey data is incorporated into simulations that are executed as part of the well surveillance and model the behavior of the entire reservoir. Such simulations predict the current overall state, producing simulated interwell data values both near and at a distance from the wellbore. Simulated near-wellbore interwell data is regularly correlated against measured near-wellbore data, with modeling parameters being adjusted as needed to reduce the error between simulated and measured data. Once so adjusted, the simulated interwell data, both near and at a distance from the wellbore, may be relied upon to assess the overall state of the reservoir.

The collected production data, however, mostly reflects conditions immediately around the reservoir wells. To provide a more complete picture of the state of the reservoir, periodic surveys of the reservoir are performed. Such surveys can include large scale electromagnetic (EM) surveys that may be performed months or even years apart. The surveys can subsequently be combined to provide a time-lapse image of a reservoir to identify trends and adjust production strategies to optimize the production of the reservoir.

However, as a result of the large periods of time between surveys, the use of permanently deployed sensors (i.e., sensors expected to be deployed once and operated for the predicted lifespan of a reservoir) has largely been considered impractical. This is because the environments to which EM sensors are exposed are generally too harsh to operate existing sensors reliably over such long periods and too inaccessible to perform any sort of equipment maintenance, failure diagnosis or repair in a cost effective manner, if at all. This is true of both offshore and onshore environments. Offshore reservoirs may be located at significant depths where the pressure and salinity can take its toll on equipment and accessibility may be limited to remotely operated vehicles with limited capabilities and high deployment and operations costs. Onshore reservoirs may appear to be more accessible, but because onshore sensors and their corresponding communication and/or power networks must be buried underground, the cost of equipment maintenance, failure diagnosis and repair can still be substantial and in some cases prohibitive. Even absent overt failures, these hostile environments can still produce long-term shifts in the measurements taken by the sensors that render the measurements inconsistent as between surveys and preclude any meaningful correlation of the survey data.

BRIEF DESCRIPTION OF THE DRAWINGS

Accordingly, there are disclosed herein methods and systems for electromagnetic (EM) reservoir monitoring. In the drawings:

FIGS. 2A-2C show illustrative optical EM sensor array configurations.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative systems and methods for electromagnetic (EM) reservoir monitoring. Illustrative production environments are first described, followed by a description of various illustrative reservoir surveillance sensor array configurations suitable for use with the disclosed systems and methods. Illustrative sensors usable within the disclosed arrays are then disclosed, together with examples of various optical transducers suitable for incorporation into the disclosed sensors. Finally, an illustrative EM reservoir monitoring method is presented within the context of an illustrative system and a software-based implementation by said system.

Figure 1A:
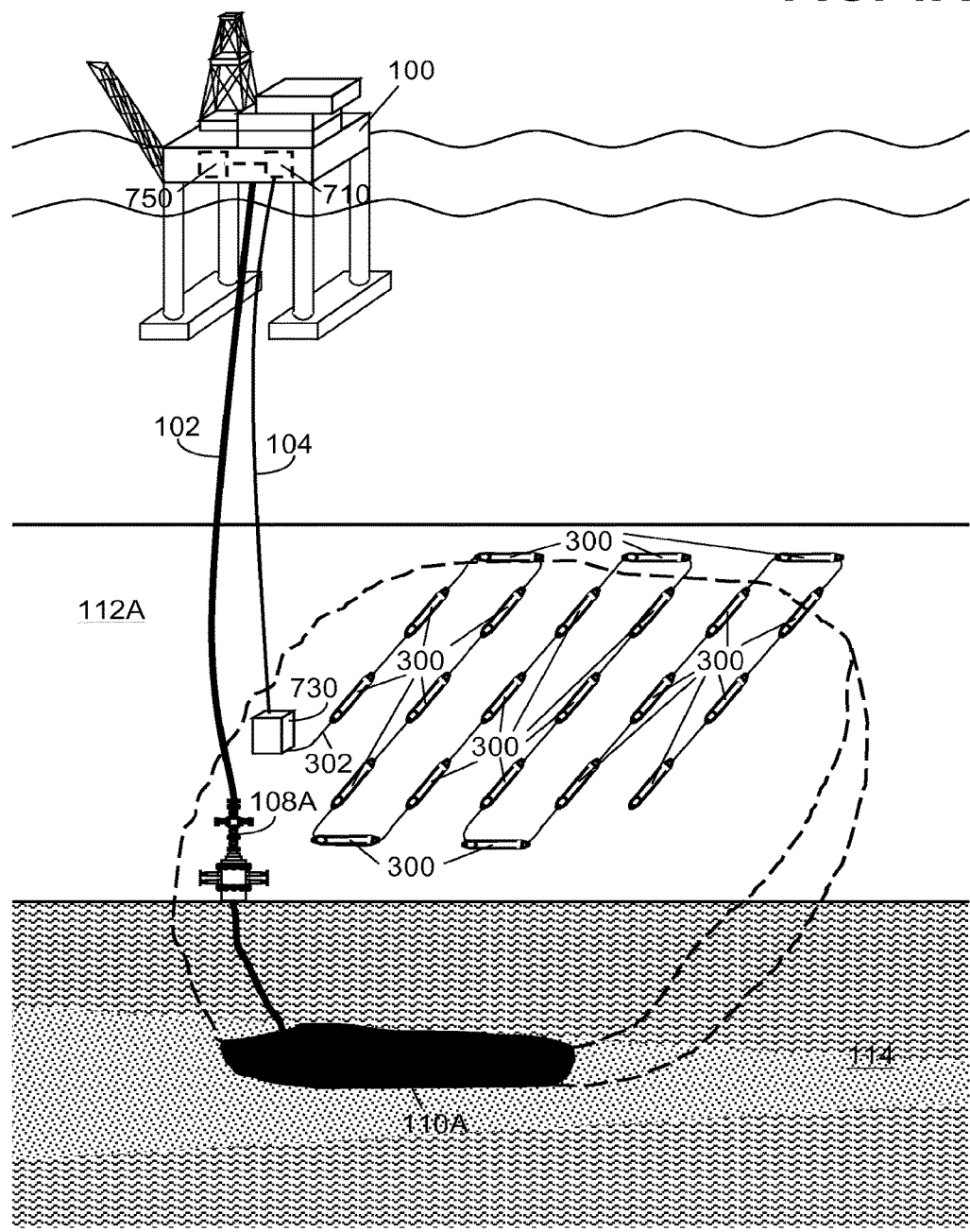
FIG. 1A shows an offshore subsea deployment of an illustrative EM reservoir monitoring system.

The disclosed systems and methods are best understood in the context of the larger systems in which they operate. Accordingly, FIG. 1A shows an illustrative offshore production platform 100 and corresponding subsea reservoir 110A. For the illustrative platform shown, fluids such as crude oil and natural gas are extracted through subsea well head 108A and flow line 102 and transported to platform 100, where the separation of oil, water and natural gas is performed. The separated fluids may then be stored for later transfer to a tanker for transport. Alternatively, in other illustrative embodiments, the platform may be coupled to an offshore pipeline through which the separated fluids can be transported onshore for further processing.

The platform also houses a processing and control system 750 which couples to a surface interface module 710. Surface interface module 710 in turn couples to subsea interface module 730 through umbilical 104, providing power from the surface to the equipment on the sea bottom. It should be noted that although described in terms of a sea or ocean, the systems and methods described herein are suitable for use within a variety of bodies of water such as, for example, a lake, a bay or a transition zone. Subsea interface module 730 couples to an array of EM sensors 300 through optical fiber 302. In other illustrative embodiments, a tubing encapsulated conductor (TEC) may be used instead of an optical fiber. A TEC can include multiple fibers and conductors, allowing a wide variety of sensors and subsea equipment to be interconnected through a single trunk cable capable of enduring the harsh conditions at the sea bottom.

Each EM sensor 300 reacts to EM signals induced into the formation below seabed 112A by either natural EM sources or one or more controlled EM sources housed within subsea interface module 730, though in other embodiments the controlled EM source(s) could be located elsewhere, for example in a separate housing on seabed 112A or within the casing of a completed reservoir well. In at least some illustrative embodiments, a light source within subsea interface module 730 directs light through optical fiber 302 and then triggers a controlled EM source, which induces EM signals within formation 114. These EM signals are received by one or more EM sensors 300, causing the sensors to modulate the interrogation light beam. Each sensor's modulation maybe distinguished by any of a number of known techniques such as time multiplexing or frequency multiplexing. The modulated beam is directed back to a detector within subsea interface module 730, where the modulation is encoded and sent to the surface for further processing. The processed data may then be used to assess the resistivity of the various formation layers, which in turn may be used to characterize the composition of the formation (e.g., using any of a number of known inversion techniques) and to identify the current state of subsea reservoir 110A.

Figure 1B:
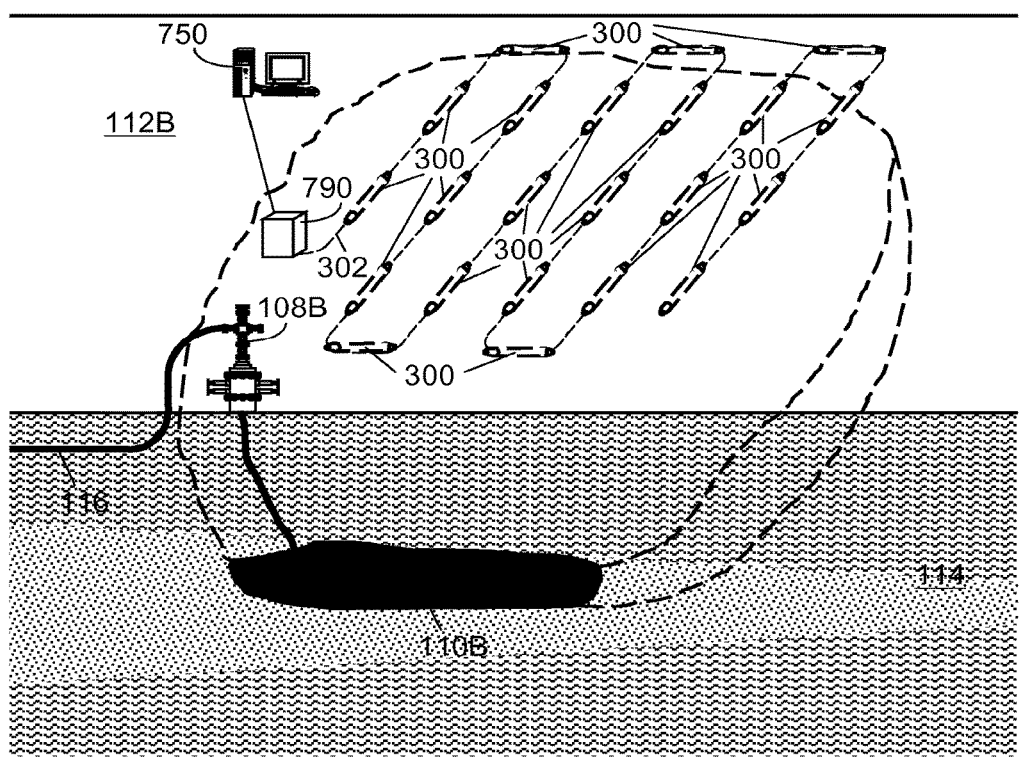
FIG. 1B shows an onshore field deployment of an illustrative EM reservoir monitoring system.

A similar configuration for onshore reservoir monitoring is shown in FIG. 1B. In at least some illustrative embodiments, however, the array of sensors 300 and optical fiber 302 is instead buried under the surface of field 112B over the reservoir to protect the sensors from damage by people, animals and vehicles. Also, onshore wellhead 108B couples to a pipeline 116, and a single field interface module 790 couples to processing and control system 750 and optical EM sensors 300 via optical fiber 302. Beyond these differences, the illustrative onshore EM reservoir monitoring system shown of FIG. 1B operates in essentially the same manner as the illustrative offshore system of FIG. 1A.

The embodiments of both FIGS. 1A and 1B show a single optical fiber running the length of the array through each sensor 300 in series. This configuration is shown in more detail in FIG. 2A where a light source 202 emits light in a continuous beam. A circulator 204 directs the light along optical fiber 302. The light travels along the optical fiber 302, interacting with each sensor 300 before reflecting off the end of the cable and returning to circulator 204 via sensors 300. The circulator directs the reflected light to a light detector 208. The light detector 208 separates the measurements associated with different sensors 300, e.g., via frequency multiplexing. In such a frequency multiplexed embodiment, each sensor 300 affects only a narrow wavelength band of the light beam, and each sensor is designed to affect a different wavelength band.

Other sensor array and optical fiber configurations are also suitable for use with the disclosed systems and methods. For example, in FIG. 2B light source 202 emits light in short pulses. Each sensor 300 is coupled to the main optical fiber 302 via a splitter 206. The splitters direct a small fraction of the light from the optical fiber to the sensor, e.g., 1% to 4%. The sensor 300 interacts with the light and reflects it back to the detector 208 via the splitter, the main fiber, and the circulator. Due to the different travel distances, each pulse of light from source 202 results in a sequence of return pulses, with the first pulse arriving from the nearest sensor 300, the second pulse arriving from the second nearest sensor, etc. This arrangement enables the detector to separate the sensor measurements on a time multiplexed basis.

The arrangements of FIGS. 2A and 2B are both reflective arrangements in which the light reflects from a fiber termination point. They can each be converted to a transmissive arrangement in which the termination point is replaced by a return fiber that communicates the light back to the surface. FIG. 2C shows an example of such an arrangement for the configuration of FIG. 2B. A return fiber is coupled to each of the sensors via a splitter to collect the light from the sensors 300 and direct it to a light detector 208.

Many illustrative sensor configurations suitable for use in the disclosed embodiments may be implemented. For example, multiple sensors may be coupled in series on each branch of the FIG. 2B, 2C arrangements. A combination of time division, frequency division and wavelength division multiplexing could be used to separate the individual sensor measurements. In at least some frequency division multiplexing embodiments, each sensor measures variations of the electromagnetic fields at different frequencies, preferably by each sensor (e.g., each monitoring a different region of the reservoir) detecting field variations created by a local electromagnetic signal source, each source operating at a different frequency. Other sensor configurations will become apparent to those of ordinary skill in the art and all such configurations are within the scope of the present disclosure.

The use of the above-described sensor arrays provides the capability of monitoring the state of reservoirs covering larger geographic expanses, whether onshore or offshore. Nonetheless, in order to provide long-term data that can be used to assess changes as hydrocarbons are extracted from a reservoir, it is desirable to perform multiple surveys of the reservoir, such as EM surveys, separated by one or more months, and in some instances separated by one or more years. Such data can be useful in identifying and predicting long-term reductions in the productivity of the reservoir. In at least some illustrative embodiments, data acquired over such long periods of time is used to build a time lapse reservoir model that can be used to predict the long-term dynamic behavior of the reservoir. Such predictions enable reservoir engineers to make changes in production elements such as, for example, the location and configuration of injector wells over time and thus optimize the overall production of the reservoir over its expected lifespan.

Figure 3:
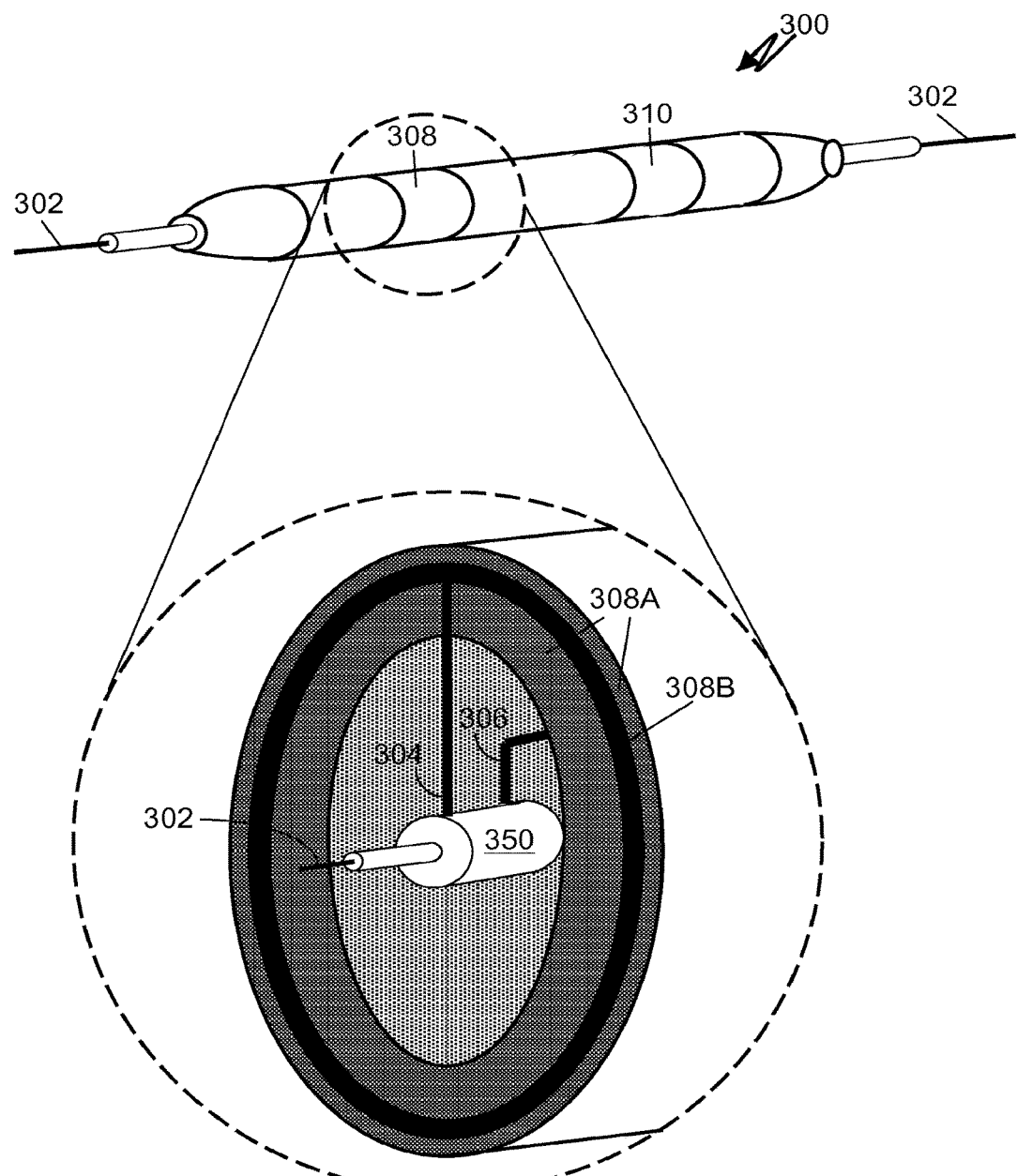
FIG. 3 shows an illustrative optical EM sensor.

In at least some illustrative embodiments, the sensor 300 configuration shown in FIG. 3 is used to provide a degree of sensor stability that produces survey data separated by months or years that can be combined and relied upon to predict reservoir behavior. Such stability is achieved at least in part by isolating several of the components of sensor 300 (e.g., electrode 308B and transducer 350) from the surrounding environment. The configuration shown in the example of FIG. 3 isolates electrode 308B by encapsulating it with a protective layer 308A (e.g., a fiberglass encapsulation), and this encapsulation protects the conductor from the adverse effects of the harsh environments in which such sensors are frequently deployed (e.g., high salinity ocean subsea environments, subterranean formation soils containing highly reactive minerals, etc.). The combination of such electrodes with an encapsulating layer creates two sensing surfaces 308 and 310 that are capacitively coupled to their immediate external environment (e.g., to the body of water around the subsea array or the subsea formation of FIG. 1A, or to the subterranean formation beneath the field of FIG. 1B). In other illustrative embodiments, the electrodes are isolated from their surrounding environment by passivating the electrodes, rather than encapsulating them. In still other illustrative embodiments, the electrodes are omitted and the isolated transducer 350 detects the EM signals directly through the housing wall of sensor 300, converting the detected EM signals into modulated optical pulses.

In the example embodiment of FIG. 3, the electric potential produced across the two capacitive electrodes by the EM signals is presented to an optical transducer within the sealed sensor 300, which modulates the interrogation light beam transmitted through optical fiber 302 as previously described. Because the sensor 300 of the illustrative embodiment of FIG. 3 is sealed and the electrodes are protected by the encapsulating layer from environmental conditions and/or chemicals that can degrade the electrodes and/or other sensor components, the sensor can be incorporated into a sensor array that is deployed once and operated for the life of the reservoir. The stability of the electrodes helps to ensure that EM signal measurements provided by the illustrative sensor 300 and taken months or years apart can be relied upon to generate a time-lapse earth model of the reservoir over the lifespan of the reservoir. The lack of active components requiring batteries or external power, as well as the use of optical fibers rather than electrical conductors to transmit data, further enhance the long-term stability and reliability of the illustrative sensor 300 and arrays that incorporate such sensors.

Figure 4:
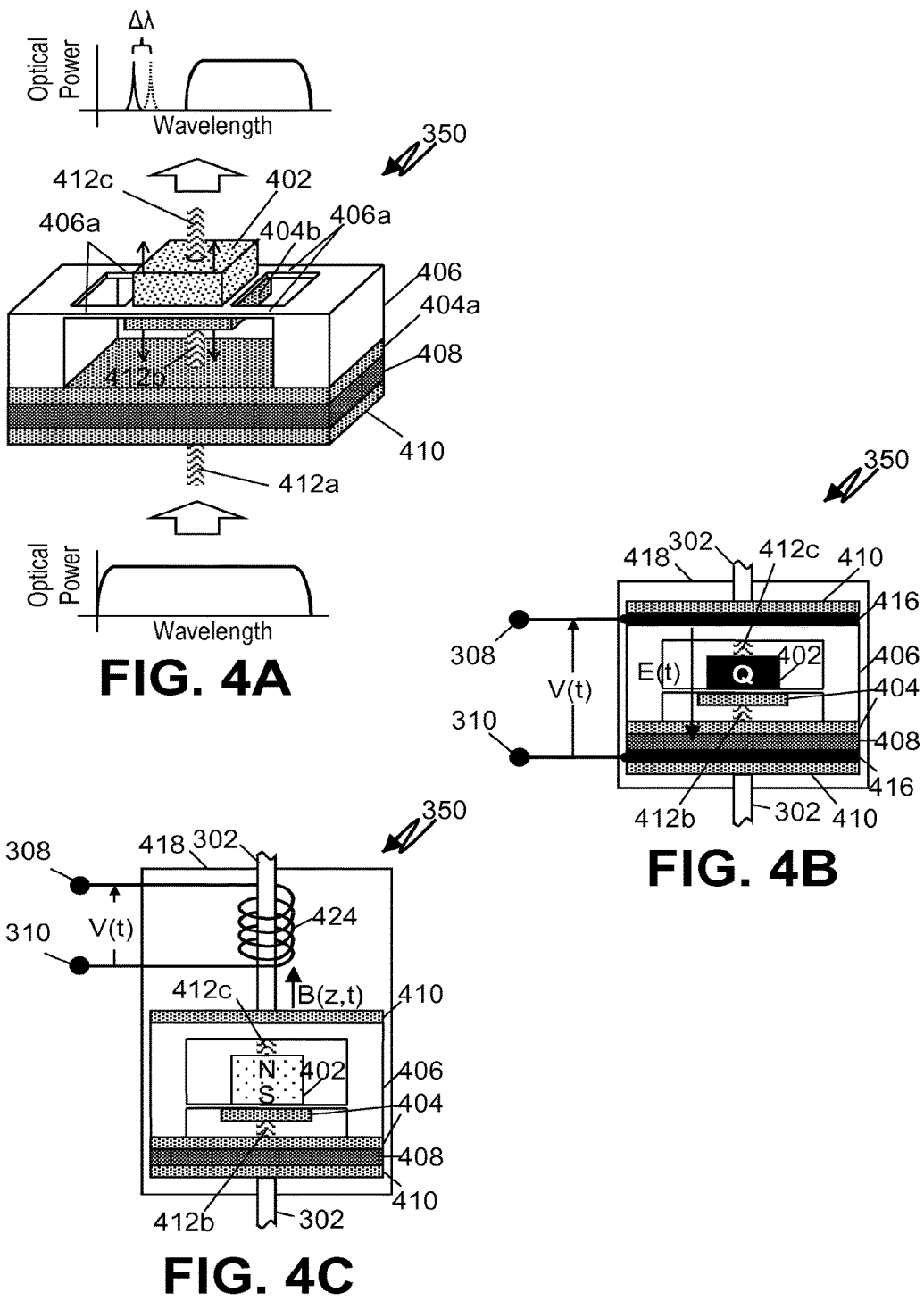
FIGS. 4A-4C show illustrative optical cavity transducer.

A number of different optical transducers that convert the electric potential produced across sensing surfaces 308 and 310 of illustrative sensor 300 into a modulation of the interrogation light beam transmitted through optical fiber 302 may be suitable for incorporation into sensor 300. FIG. 4A shows an illustrative micro-opto-electro-mechanical system (MOEMS) embodiment of transducer 350 suitable for use in a wavelength multiplexed sensor array. The illustrative MOEMS transducer is built upon a substrate 408, which may include transparent materials such as silicon, which is transparent to near-infrared light, or an opening or other optical path that permits a light beam 412 to traverse the transducer, entering the transducer as light beam 412a, passing through the optical cavity of the transducer as light beam 412b, and exiting the optical cavity as light beam 412c. Substrate 408 is covered on one side by a layer 404a to create a surface that is reflective over a portion of the light spectrum, and on the other side by an antireflection layer 410. A support structure 406 attaches to (or is integral with) substrate 408 and suspends an opposing movable layer 404b (which also has a reflective surface) and a field sensitive element 402 using four flexible members or "beams" 406a.

Beams 406a are formed from a resilient, flexible material that enables an electric or magnetic field (depending on the compositions of field sensitive element 402) to displace the movable layer 404b along a translational axis parallel to the beam of light (as indicated by the upward and downward facing arrows). In the embodiment shown, the beams 406a provide a restoring force that returns the movable layer 404b to a neutral position in the absence of forces imposed on the field sensitive element 402, and also constrain the movement of movable layer 404b and field sensitive element 402 to a path along the aforementioned translational axis (i.e., perpendicular to the top surface of support structure 406). The displacement of layer 404b varies an optical passband of the optical cavity by changing the distance between the two partially reflective surfaces (layer 404a and moveable layer 404b). For a time-variant electromagnetic field, the movement produces a corresponding time-variance in the wavelength of that portion of the light spectrum affected by the optical cavity. The resulting optical spectrum or wavelength variation Δλ shown in FIG. 4A is directly related to the peak-to-peak magnitude of the measured field.

In at least some illustrative embodiments, the source of the light entering the optical cavity is preferably a wideband light source as shown in FIG. 4A. In the example shown, light wavelengths immediately above and below a passband wavelength of the optical cavity are blocked by destructive interference, but light at the passband frequency and sufficiently above or below the passband propagate through the optical cavity. In the example shown in FIG. 4A, a significant portion of the light with a wavelength above one of the optical cavity's passband wavelengths propagates through the cavity with little or no attenuation. This unattenuated portion of the propagated light's bandwidth is available for use by other optical cavities tuned to different passband wavelengths coupled in series along a single fiber. The optical cavities operate to together produce a wavelength multiplexed optical signal.

FIGS. 4B and 4C show more detailed embodiments of the optical transducer of FIG. 4A. The electric field E(t) to which the MOEMS transducer of FIG. 4B is exposed is generated by the electric potential produced across sensor surfaces 308 and 310 of sensor 300. The potential V(t) is applied across electrically conductive layers 416, positioned to either side of field sensitive element 402. As a result, any electrical potential induced by electromagnetic fields within the surrounding formation are applied across layers 416, which act like the plates of a parallel plate capacitor between which the electric field E(t) is induced. The derivation of the electric field E(t) is derived from the optical wavelength variations, and once the electrical potential present at sensor surfaces 308 and 310 is known, the electric or magnetic properties being measured, such as electric resistivity, electric permittivity and/or magnetic permeability and corresponding composition of the surrounding formation can be derived using any of a wide variety of known techniques, given a known transmitted excitation signal.

Similarly, the magnetic field B(z,t) to which the optical transducer is exposed is generated by an electrical potential applied across sensor surfaces 308 and 310 and thus across induction coil 424 positioned above and along the translational axis of field sensitive element 402. In the embodiment shown, the magnetic axis of the induction coil 424 is preferably oriented to be parallel to the magnetic axis of field sensitive element 402, with both magnetic axes also being preferably parallel to the translational axis of field sensitive element 402. Nonetheless, other orientations of induction coil 424 and field sensitive element 402 are contemplated and are within the scope of the present disclosure. Induction coil 424 is electrically coupled to sensor surfaces 308 and 310. As a result, any electrical potential induced by electromagnetic fields within the surrounding formation is applied across induction coil 424. After solving for the gradient of B(z,t), the field B(z,t) can be determined with an appropriate calibration of the transducer.

Figure 5:
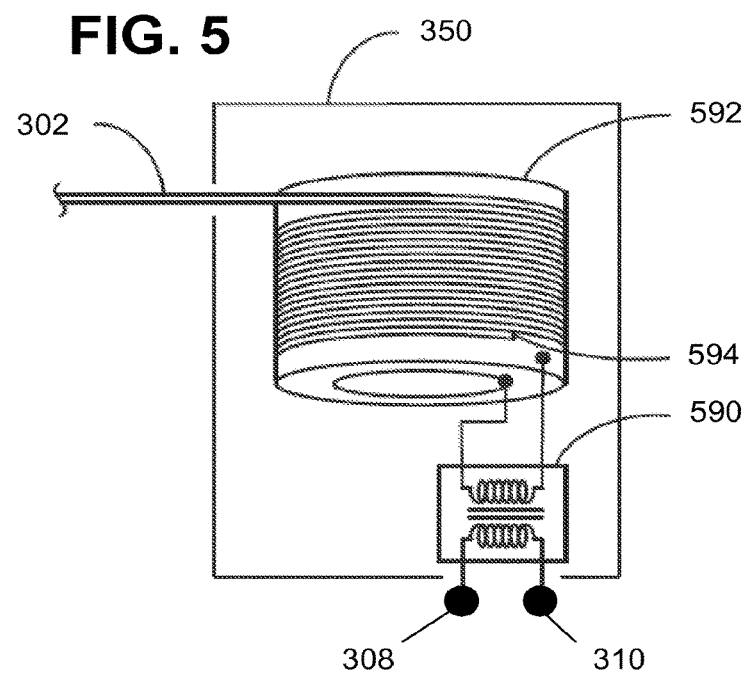
FIG. 5 shows an illustrative piezoelectric optical transducer.

FIG. 5 shows another illustrative embodiment of the optical transducer 350, implemented as a variable optical path length transducer. In the embodiment of FIG. 5, the transducer 350 includes an (optional) impedance matching transformer 590 coupled between the sensor surfaces 308 and 310 and the drive electrodes of a cylinder 592 of piezoelectric material. The impedance matching transformer 590 provides an efficient way to scale the EM signal voltage to match the drive requirements for the piezoelectric cylinder.

The piezoelectric cylinder 592 is a hollow cylinder with an inner surface electrode and an outer surface electrode.

The piezoelectric material is a substance that exhibits the reverse piezoelectric effect: the internal generation of a mechanical force resulting from an applied electrical field. Suitable piezoelectric materials include lead zirconate titanate (PZT), lead titanate, and lead metaniobate. For example, a lead zirconate titanate crystals will change by about 0.1% of their static dimension when an electric field is applied to the material. The piezoelectric cylinder 592 is configured such that a diameter of the outer surface of the piezoelectric cylinder 592 changes when an electrical voltage is applied between the inner and outer surfaces. As a result, the diameter of the outer surface of the piezoelectric cylinder 592 is dependent on the electrical voltage applied across sensor surfaces 308 and 310.

In the embodiment of FIG. 5, a terminal portion of the optical fiber 26, including an end or terminus 94 of the optical fiber 26, is wound around the outer surface of the piezoelectric cylinder 92. The terminal portion of the optical fiber 302 is tightly wound around the outer surface of the piezoelectric cylinder 592 such that the terminal portion of the optical fiber 302 is under some initial mechanical stress. The terminus 594 is preferably attached to the outer surface of the piezoelectric cylinder 592, and may or may not have a mirrored coating or layer to reflect light (i.e., a mirrored terminus). Even in the absence of a mirrored coating, the terminus 594 may be expected to reflect a significant fraction of the incident light due to an index of refraction mismatch with the air. As the cylinder's diameter expands or contracts, so too does the cylinder's circumference, thereby stretching the length of the terminal portion of the optical fiber 302 accordingly. Any stretching of the optical fiber also increases the mechanical stress being imposed on the fiber. These two effects combine to increase the optical path length through the transducer for any light traveling to or from the terminus 594, thus producing a time shift in the arrival time of the reflected light at the detector (e.g., optical detector 208 of FIG. 2B).

Figure 6:
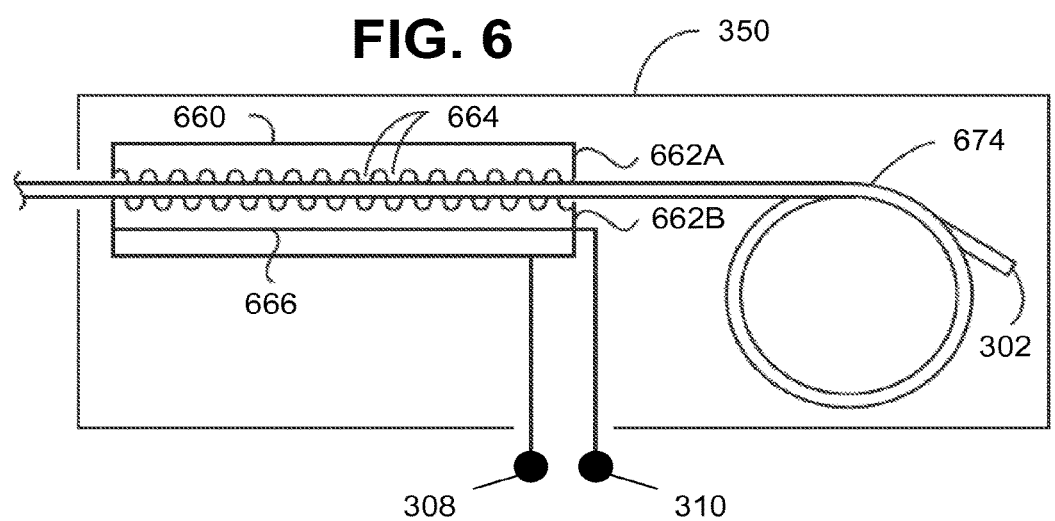
FIG. 6 shows an illustrative magnetostrictive optical transducer.

FIG. 6 is a diagram of yet another illustrative embodiment of optical transducer 350, which exploits a light-leakage characteristic of optical fibers. Optical fibers typically include a transparent core surrounded by a transparent cladding material having a lower index of refraction, so that light propagating fairly parallel to the fiber's axis is trapped in the core by the phenomenon of total internal reflection. If bent too sharply, however, the angle between the light's propagation path and the cladding interface is no longer sufficient to maintain total internal reflection, enabling some portion of the light to escape from the fiber.

This light leakage characteristic can be exploited with a microbend sensor or microbender 660 such as that shown in FIG. 6. The microbender 660 includes a pair of opposed ridged elements 662A and 662B, each having a row of ridges 664 in contact with an outer surface of the optical fiber 302. The optical fiber 302 is positioned in a gap between the ridged elements 662A and 662B. The teeth 664 of the ridged elements 662A and 662B are aligned so as to intermesh. In other words, ridges on one element align with valleys in the other element and vice versa. A force or pressure that urges the ridged elements 662A and 662B toward one another causes small bends or "microbends" in the optical fiber 302 at multiple locations along the optical fiber 302. As a result, light propagating along the optical fiber 302 is attenuated by an amount dependent upon the force or pressure that urges the ridged elements 662A and 662B toward one another.

In the embodiment of FIG. 6, the ridged element 662B is mounted on a piezoelectric substrate 666 that exhibits a change in dimensions when an electric field is applied between its upper and lower surfaces. The leads from sensor surfaces 308 and 310 apply a rectified voltage signal to the upper and lower surfaces of the piezoelectric substrate 166, causing the gap to briefly close in response to the passing of a casing collar. Alternatively, the substrate 666 may be a magnetostrictive material surrounded by a coil that induces a magnetic field in response to a voltage signal from sensor surfaces 308 and 310.

Figure 7A:
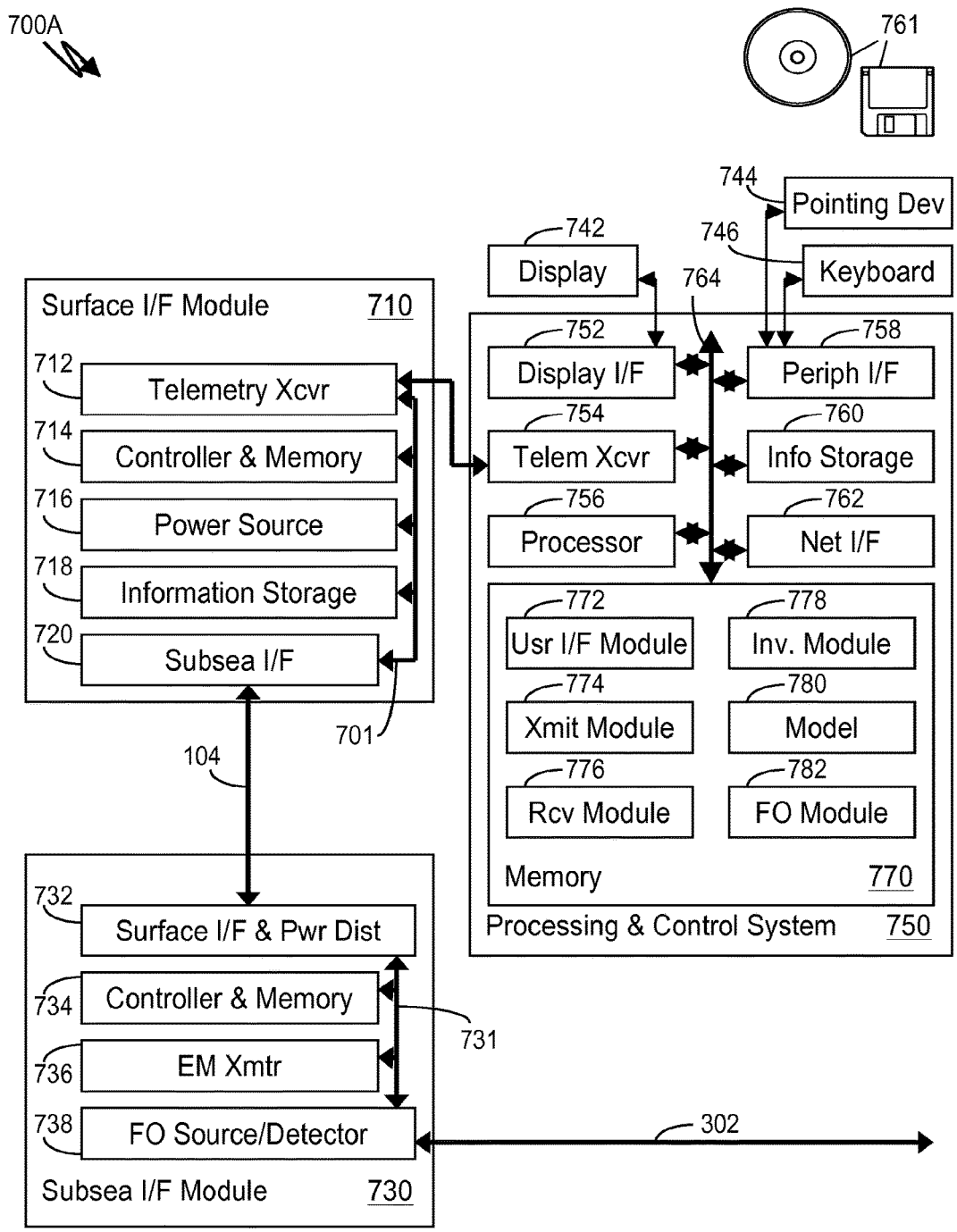
FIG. 7A shows an illustrative offshore system for controlling and processing data from an optical EM sensor array.
Figure 7B:
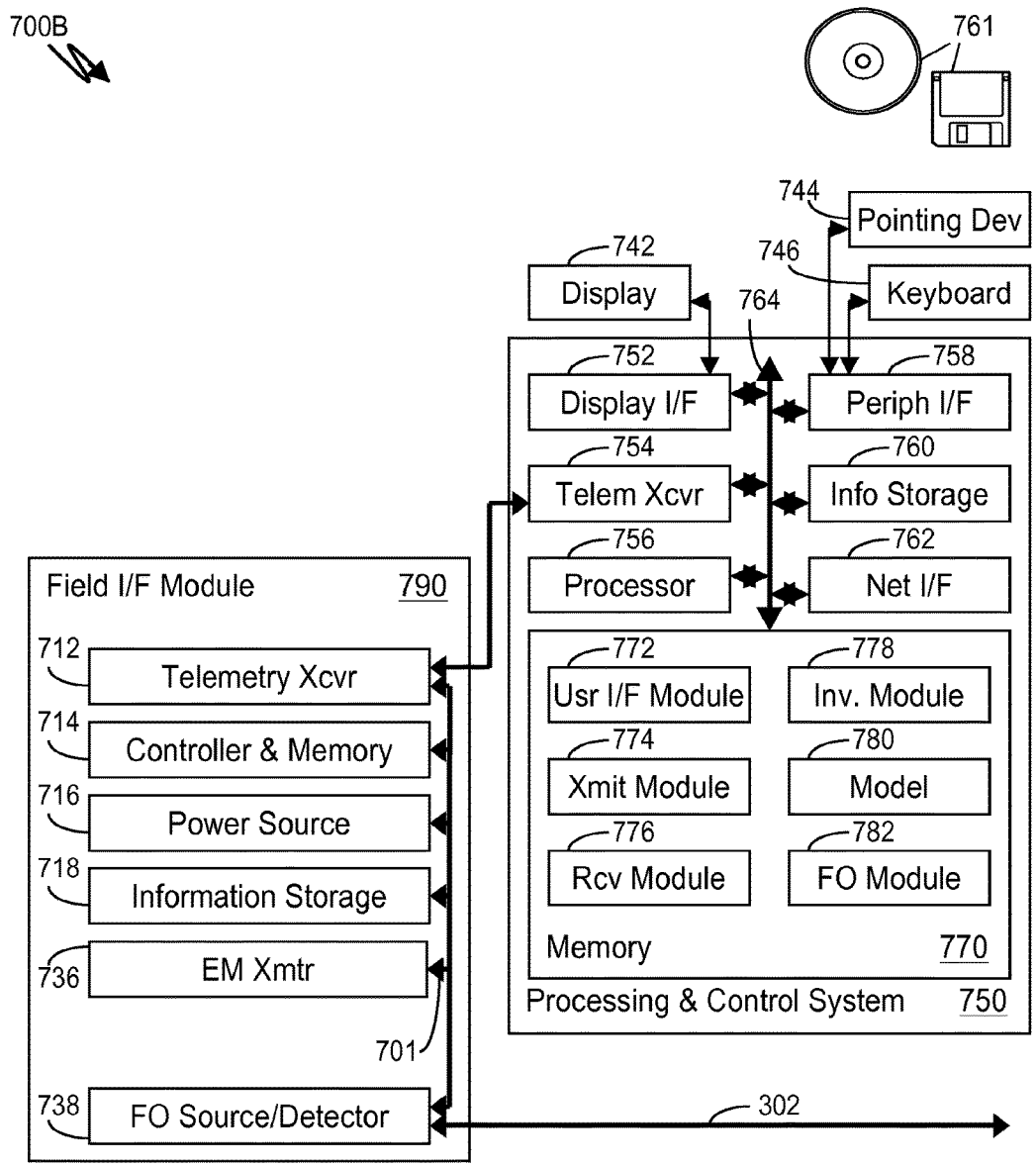
FIG. 7B shows an illustrative onshore system for controlling and processing data from an optical EM sensor array.

As previously noted, the light beam modulated by the above-described transducers of EM sensor 300 is encoded and presented to a processing and control system that provides further processing of the collected EM survey data. FIGS. 7A and 7B show illustrative embodiments of EM reservoir monitoring systems 700A (offshore) and 700B (onshore), which both include a processing and control system 750, together with various interface modules for interfacing with an array of sensors 300. FIGS. 7A and 7B show both hardware and software components of EM reservoir monitoring systems 700A and 700B, which in at least some illustrative embodiments implement at least part of the method 800 of FIG. 8. A user may interact with control and processing system 750 of the systems 700A and 700B via keyboard 746 and pointing device 744 (e.g., a mouse) to send commands and configuration data to surface interface module 710 and subsea module 730 of FIG. 7A and to field interface module 790 of FIG. 7B.

Located within processing and control system 750 is a display interface 752, a telemetry transceiver 754, a processor 756, a peripheral interface 758, an information storage device 760, an network interface 762 and a memory 770. Bus 764 couples each of these elements to each other and transports their communications. Telemetry transceiver 754 enables the processing and control system 750 to communicate with the array of sensors 300 via surface interface module 710 and subsea interface module 730 (offshore) and via field interface module 790 (onshore). Network interface 762 enables communications with other systems (e.g., a central data processing facility via the Internet). In accordance with user input received via peripheral interface 758 and program instructions from memory 770 and/or information storage device 760, processor 756 processes telemetry information received via telemetry transceiver 754 to build and combine time-lapse reservoir models in accordance with the disclosed methods and displays the results produced by the models to the user. In at least some illustrative embodiments, the processing and control system 750 is preferably configured by software (e.g., in the form of non-volatile removable media 761) to control the EM monitoring system and to process the EM survey data as described.

In at least some illustrative embodiments, processing and control system 750 of FIG. 7A communicates with surface interface module 710, which acts as a distribution and/or concentration point for command and telemetry to and from one or more subsea interface modules 730 located on the sea bottom. Each subsea interface module 730 similarly acts as a distribution and/or concentration point between surface interface module 710 and one or more arrays of sensors 300. In the illustrative offshore embodiment shown in FIG. 7A, surface interface module includes a telemetry transceiver 712 (similar to telemetry transceiver 754), which provides a data communication interface (either wired as shown or wireless) with processing and control system 750; controller and memory 714, which executes software stored on information storage device 716, both operating in a manner similar to processor 756 and information storage device 760 to provide at least some of the functionality of surface interface module 710; power source 716, which provides power for the components of the surface interface module 710 and for subsea interface module 730; and subsea interface 720, which couples to surface interface and power distribution 732 of subsea interface module 730 and provides power and a data interface to the subsea interface module 730. Each of the components within surface interface module 710 are coupled to each other via bus 701, which provides data communication between and power to the various components.

Continuing to refer to FIG. 7A, subsea interface module 730 includes surface interface and power distribution 732, which provides the data interface with the surface and distributes power received from the surface to the components of the module; controller and memory 734, which stores and executes software that provides at least some of the functionality of the module; EM controlled source transmitter 736, which optionally provides a controlled EM source for inducing an EM signal in the surrounding formation as previously described; and fiber-optic source/detector 738, which includes one or more optical transmitters (e.g., LED lasers) that generate the interrogation light beam(s) transmitted to the array of sensors 300 via optical fiber 302, and one or more optical detectors that sense the modulated light beams received from the array of sensors via optical fiber 302 and further convert the modulated light beams into a digital signal (either electrical or optical) for transmission to the surface. Fiber optic source/detector 738 may also optionally include an optical circulator for use in single fiber systems as previously described, as well as one or more analog-to-digital (A/D) converters to convert the analog signals produced by the optical receivers to digital data suitable transmission to the surface.

Figure 8:
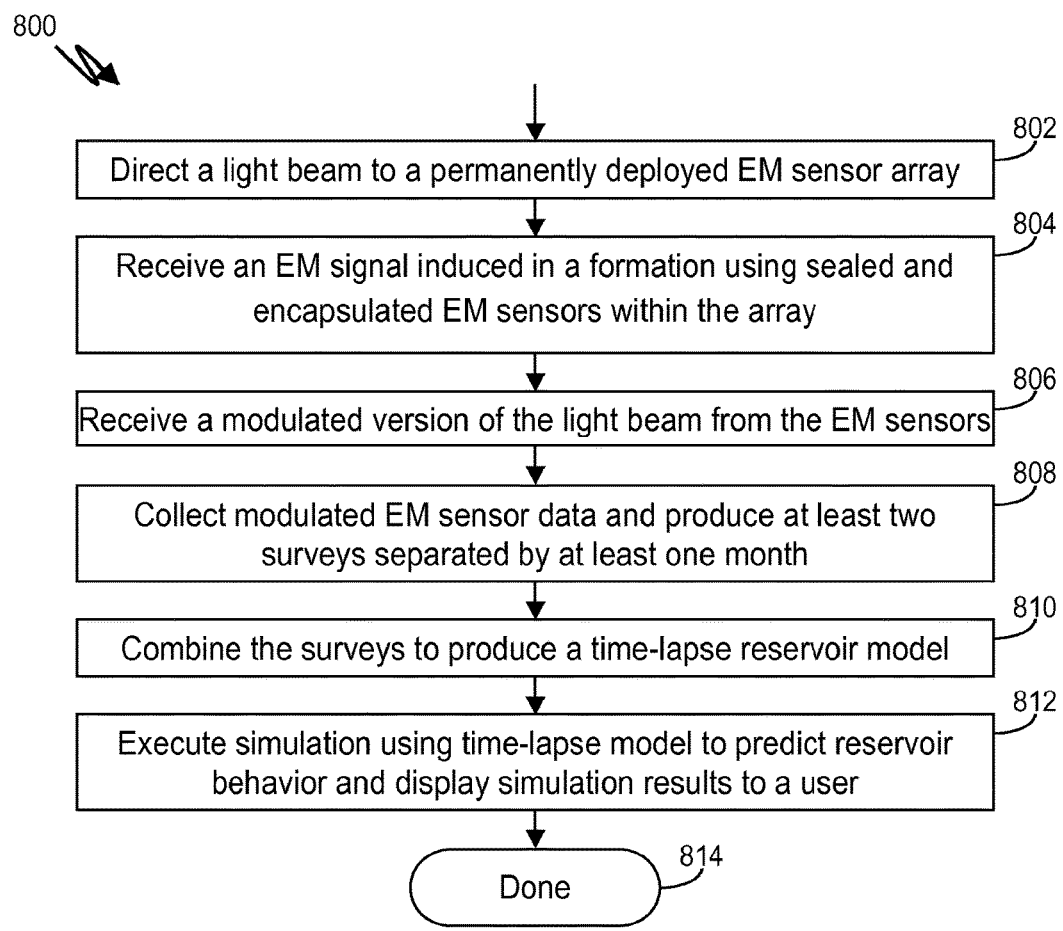
FIG. 8 shows an illustrative method for operating an optical EM sensor array.

FIG. 7B shows an illustrative embodiment of an EM reservoir monitoring system for onshore operation that is similar to the offshore embodiment of FIG. 7A. Continuing to refer to FIG. 7B, field interface module 790 incorporates components similar to those of both surface interface module 710 and subsea interface module 730 of the offshore embodiment, and includes telemetry transceiver 712, controller and memory 714, power source 716, information storage device 718, EM controlled source transmitter 736 and fiber-optic source/detector 738, each of which operate in the same manner as described above in the offshore embodiment of FIG. 7A.

s FIG. 8 shows an illustrative method 800, at least part of which may be implemented by software executing on processing and control system 750. It should be noted that although the embodiment of FIG. 8 shows the various software modules executing on processing and control system 750, in other illustrative embodiments some or all of the modules may be stored execute on other components within EM reservoir monitoring systems 700A or 700B, including, e.g., controller and memory 714 of surface interface module 710, controller and memory 734 of subsea interface module 730 and controller and memory 714 of field interface module 790. Further, the software modules may execute on two or more of the components concurrently in a distributed manner.

Referring now to both FIG. 7A (which includes the same software modules as FIG. 7B) and FIG. 8, transmission of an interrogation light beam is initiated and directed to a permanently deployed array of sensors 300, i.e., deployed with the intent of operating the array for the lifespan of the monitored reservoir without removal of the array (block 802; fiber-optic module 782). An EM signal induced by an EM source in the formation surrounding the monitored reservoir is received by the sealed and encapsulated sensors 300 of the array (block 804, receive module 776). In at least some illustrative embodiments, the EM source is a natural source, while in other illustrative embodiments the EM source is a controlled source (e.g. EM controlled source transmitter 736) that is commanded to turn on and off as needed by the software executing on processor 756.

One or more of the EM sensors 300 modulates the interrogation light beam as it passes through the sensor, and the modulated beam is received from the sensors (block 806; fiber-optic module 782). The EM sensor data is collected and used to produce at least two surveys that are separated in time by at least one month (block 808; inversion module 778), with the survey data being combined to produce a time-lapse earth model of the reservoir (block 810; model 780). The resulting model is then used to simulate the reservoir and predict it future behavior (block 812; model 780) with the simulation results being presented to the user (block 812; block 772), ending the method (block 814).

It should be noted that the use of optical fibers and/or TECs enable other sensor systems to be incorporated into the sensor array, providing additional concurrently collected data to be combined with the survey data produced from EM data collected from the EM sensor 300 array. For example the optical fiber can be used as a sensing device within a distributed temperature sensor system (DTSS), enabling the collection of temperature data at the location of each EM sensor 300 that can be used to temperature calibrate the data collected. Seismic sensors may also be deployed and coupled to the fiber or TEC to provide con currently collected seismic data that may also be combined with the EM sensor survey data. The combination of EM survey, temperature and seismic data enhances the resolution and accuracy of the time-lapse earth model produced. Other types of sensors and data that can be combined with the EM survey data, such as geophysical and production well data, will become apparent to those of ordinary skill in the art, and all such sensors, data and combinations are within the scope of the present disclosure.

Numerous other modifications, equivalents, and alternatives, will become apparent to those skilled in the art once the above disclosure is fully appreciated. For example although the embodiments described included a single subsea interface module coupled to a single sensor array over a single reservoir, other illustrative embodiments may include multiple subsea interface modules, each coupled to multiple arrays deployed over separate regions of a reservoir or over multiple reservoirs within a production field. It is intended that the following claims be interpreted to embrace all such modifications, equivalents, and alternatives where applicable.

What is claimed is:

1. An onshore electromagnetic (EM) reservoir monitoring system that comprises:
   a light source that produces an interrogation light beam;
   an array of EM sensors positioned above ground or buried underground within an onshore production field and above one or more regions of interest within a subterranean formation, the EM sensors coupled to each other and the light source with at least one optical fiber, wherein at least one of the EM sensors modulates the interrogation light beam in response to an EM signal induced into the subterranean formation by an EM source;
   a processor that couples to and controls the light source, and further couples to and processes the modulated light received from the array via the at least one optical fiber, wherein said EM sensors and said processor collect EM data to produce two or more EM surveys, each EM survey based on data sets collected at different times;
wherein each EM sensor is physically isolated from a surrounding environment, the EM sensor comprising two cylindrical electrodes arranged provide sensing surfaces to receive the EM signal, a cylindrical encapsulation layer arranged over the cylindrical electrodes to isolate the cylindrical electrodes from the surrounding environment, an optical transducer arranged within the cylindrical electrodes, and the optical fiber arranged within the optical transducer, wherein the optical transducer is arranged to modulate the interrogation light beam in response to the EM signal induced into the subterranean formation by the EM source; and
wherein the two or more surveys are combined to produce a time-lapse earth model of the one or more regions of interest.

2. The system of claim 1, wherein the data sets corresponding to at least two of the two or more EM surveys are collected at times separated by at least one month.

3. The system of claim 1, wherein the cylindrical electrodes are encapsulated in fiberglass to avoid direct contact with the surrounding environment and are each capacitively coupled to the ground of the onshore production field.

4. The system of claim 1, wherein the EM source comprises a controlled EM source coupled to and controlled by the processor or comprises a natural EM source.

5. The system of claim 1, wherein the collected EM data is sampled continuously.

6. The system of claim 1, wherein the at least one EM sensor comprises a transducer selected from the group consisting of an optical cavity transducer, a variable optical path length transducer and a microbender transducer.

7. The system of claim 1, wherein the collected EM data is combined with other geophysical data or other production data to improve resolution of the time lapse earth model of the one or more regions of interest.

8. The system of claim 1, wherein the at least one optical fiber is part of a distributed temperature sensor system (DTSS) and wherein temperature data from the DTSS is used to calibrate the collected EM data.

9. The system of claim 1, wherein the at least one optical fiber further couples to a seismic sensing system and wherein the processor combines seismic data from the seismic sensing system with the collected EM data to improve resolution of the earth model of the one or more regions of interest.

10. An onshore electromagnetic (EM) reservoir monitoring method that comprises:
causing a light source to direct a beam of light through at least one optical fiber to an array of EM sensors placed above ground or buried underground within an onshore production field and above one or more regions of interest within a subterranean formation;
receiving a modulated version of the beam of light, at least one of the one or more EM sensors modulating the beam of light in response to an EM signal induced within the subterranean formation by an EM source, each EM sensor being physically isolated from a surrounding environment, the EM sensor comprising two cylindrical electrodes arranged provide sensing surfaces to receive the EM signal, a cylindrical encapsulation layer arranged over the cylindrical electrodes to isolate the cylindrical electrodes from the surrounding environment, an optical transducer arranged within the cylindrical electrodes, and the optical fiber arranged within the optical transducer, wherein the optical transducer is arranged to modulate the beam of light in response to the EM signal induced into the surrounding environment by the EM source;
collecting EM data based on the received modulated light beam and producing two or more EM surveys, each EM survey based on data sets collected at different time;
combining the two or more surveys and producing a time-lapse earth model of the one or more regions of interest; and
executing simulations using the time-lapse earth model to predict reservoir behavior and displaying simulation results.

11. The method of claim 10, wherein the collecting of EM data for data sets corresponding to at least two of the two or more EM surveys each occurs at times separated by at least one month.

12. The method of claim 10, further comprising using the cylindrical electrodes to avoid direct contact with the surrounding environment, said cylindrical electrodes being capacitively coupled to the ground of the onshore production field, wherein the cylindrical electrodes are encapsulated in fiberglass.

13. The method of claim 10, wherein the EM source comprises a controlled EM source or a natural EM source.

14. The method of claim 10, further comprising collecting the EM data continuously.

15. The method of claim 10, wherein at least one of the one or more EM sensors comprises a transducer selected from the group consisting of an optical cavity transducer, a variable optical path length transducer and a microbender transducer.

16. The method of claim 10, further comprising combining the collected EM data with other geophysical data or other production data to improve resolution of the time lapse earth model of the one or more regions of interest.

17. The method of claim 10, wherein the at least one optical fiber is part of a distributed temperature sensor system (DTSS) and the method further comprising calibrating the collected EM data with temperature data from the DTSS.

18. The method of claim 10, wherein the at least one optical fiber further couples to a seismic sensing system and the method further comprises combining seismic data from the seismic sensing system with the collected EM data to improve resolution of one or more reservoir models.

* * * * *